4 Sheets—Sheet 1.
R. J. COLVIN.
Combined Rake and Tedder.
No. 227,734. Patented May 18, 1880.
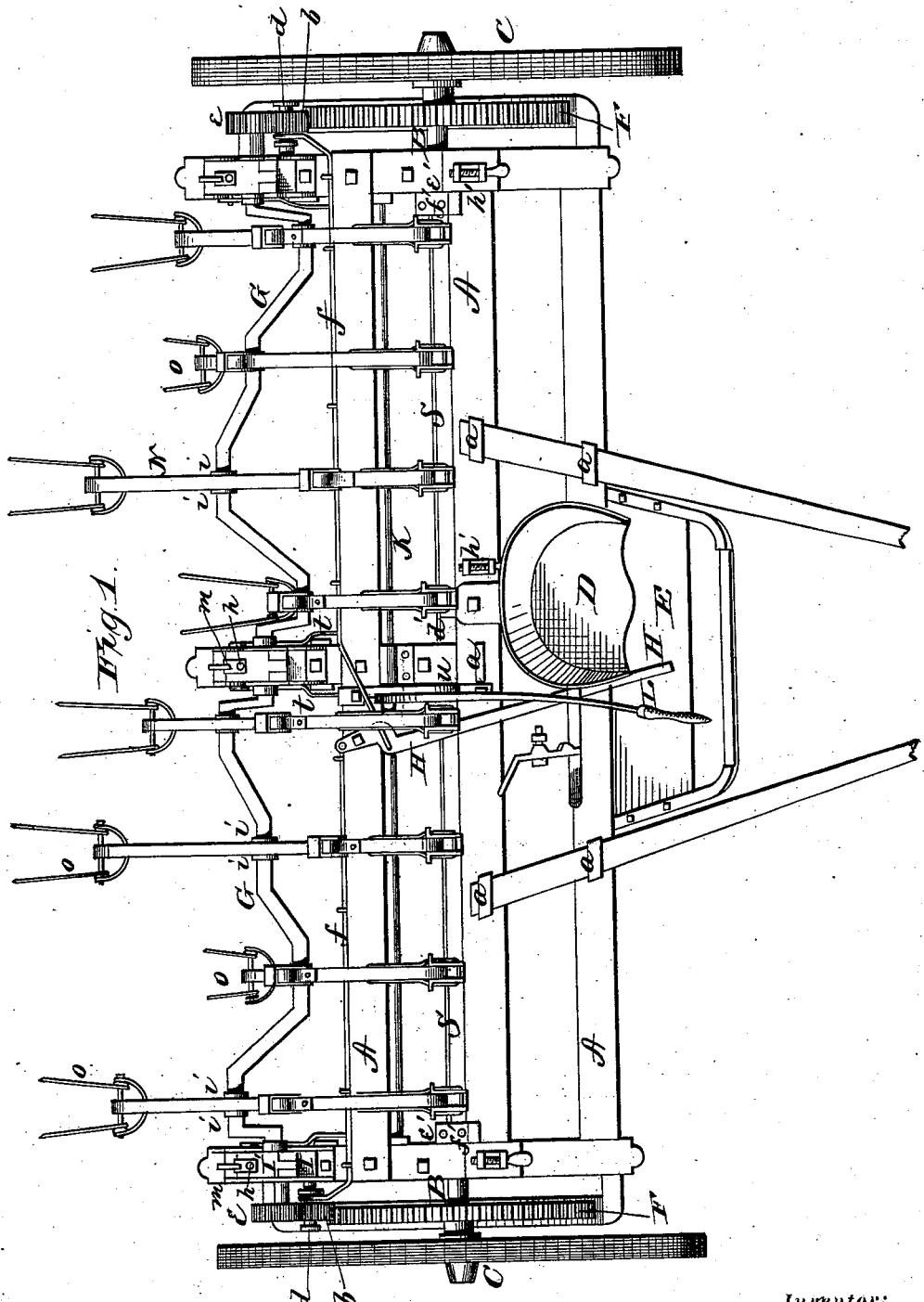
Witnesses:
Franck L. Ouraud
H. Aubrey Toulmin
Inventor:
Robert J. Colvin
By Alexander Mason
Att'y 4 Sheets—Sheet 2.
R. J. COLVIN.
Combined Rake and Tedder.
No. 227,734. Patented May 18, 1880.
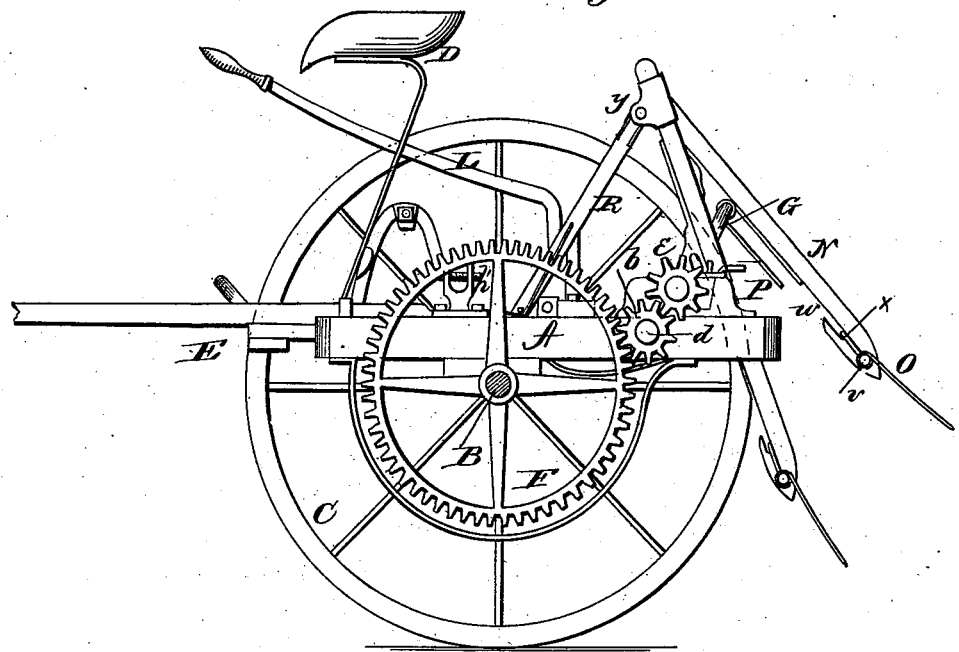
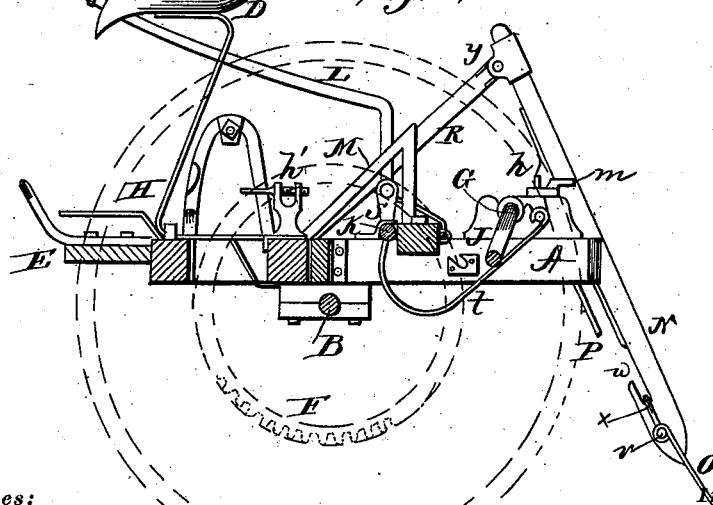
Witnesses:
F. L. Ourand
H. Aubrey Faulknin
Inventor:
Robert J. Colvin
By Alexander Hunter 4 Sheets—Sheet 3.
R. J. COLVIN.
Combined Rake and Tedder.
No. 227,734. Patented May 18, 1880.
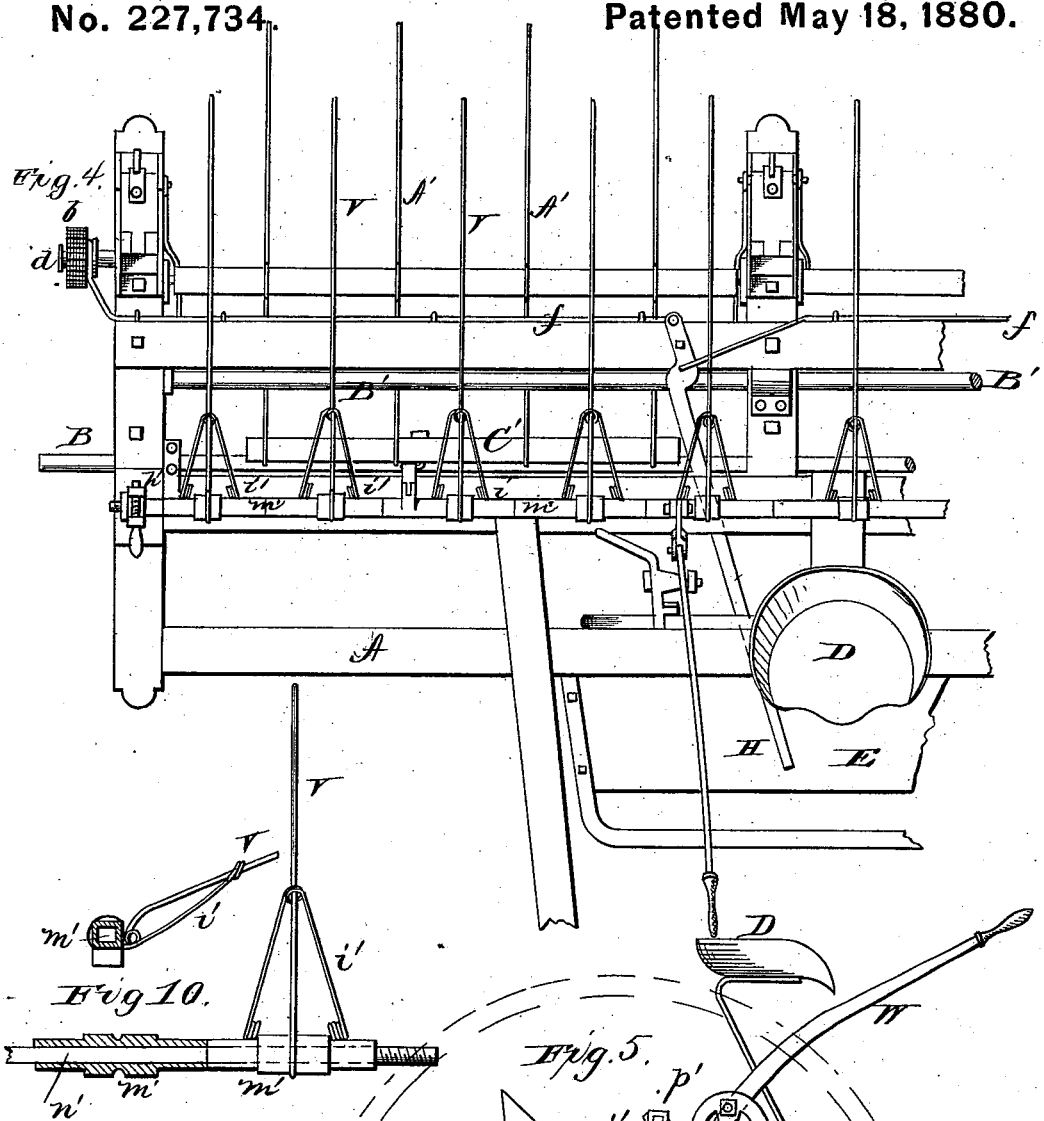
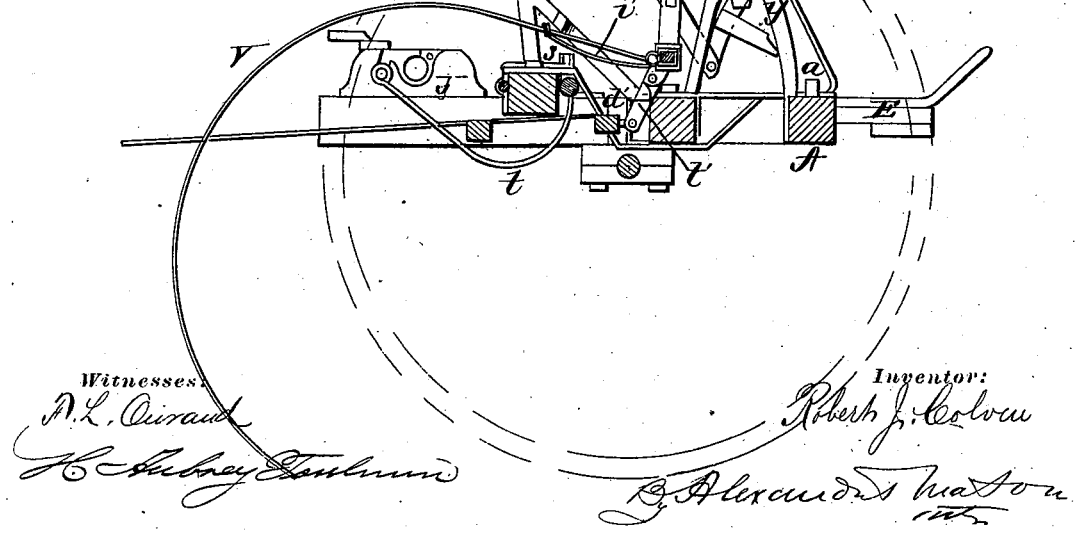

4 Sheets—Sheet 4.
R. J. COLVIN.
Combined Rake and Tedder.
No. 227,734. Patented May 18, 1880.
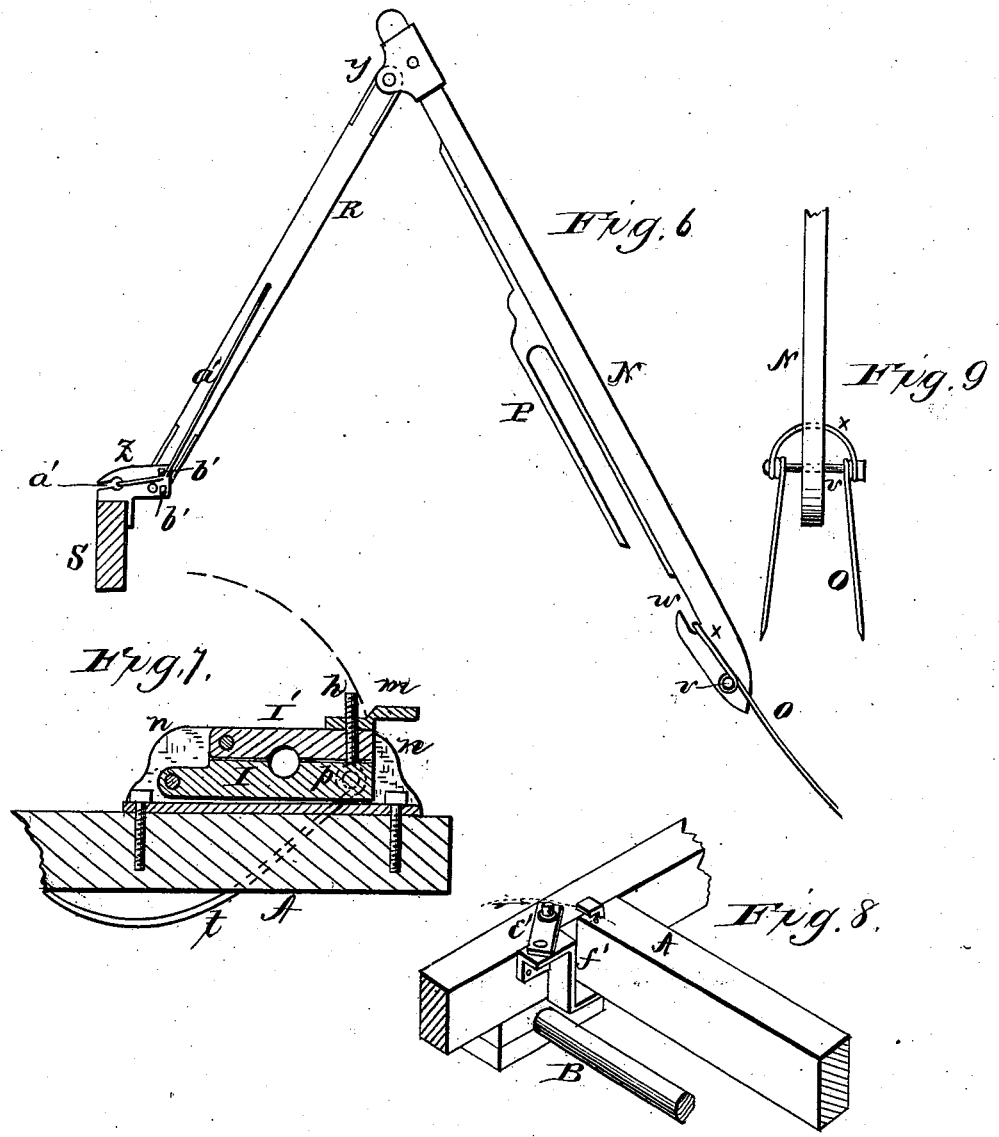

UNITED STATES PATENT OFFICE.

ROBERT J. COLVIN, OF LANCASTER, PENNSYLVANIA, ASSIGNOR OF ONE-HALF OF HIS RIGHT TO ISRAEL L. LANDIS, OF SAME PLACE.

COMBINED RAKE AND TEDDER.

SPECIFICATION forming part of Letters Patent No. 227,734, dated May 18, 1880.

Application filed January 27, 1880.

*To all whom it may concern:*

Be it known that I, ROBERT J. COLVIN, of Lancaster, in the county of Lancaster, and in the State of Pennsylvania, have invented certain new and useful Improvements in Combined Rake and Tedder; and I do hereby declare that the following is a full, clear, and exact description thereof, reference being had to the accompanying drawings, and to the letters of reference marked thereon, making a part of this specification.

The nature of my invention consists in certain improvements upon the combined hay tedder and rake for which Letters Patent No. 138,132 were granted to me April 22, 1873, and will be hereinafter more fully set forth, and pointed out in the claims.

In order to enable others skilled in the art to which my invention appertains to make and use the same, I will now proceed to describe its construction and operation, referring to the annexed drawings, in which—

Fig. 1 is a plan view of my improved hay-tedder. Fig. 2 is a side elevation, and Fig. 3 a vertical cross-section, of the same. Fig. 4 is a partial plan view, and Fig. 5 a vertical cross-section, of the rake. Fig. 6 is an enlarged side view of one of the tedder-arms and its connections. Fig. 7 is a longitudinal section of the journal-box for the crank-shafts of the tedder. Fig. 8 is a perspective view of a part of the frame. Fig. 9 is a front view of a tedder-fork. Fig. 10 is a detailed view of the rake-head and one tooth.

A represents an oblong frame, of any suitable size and construction, provided with an axle, B, on the ends of which the wheels C C are placed. The frame is also provided with keepers $a$, which adapt it for the attachment of a pole or a pair of shafts, and is readily changed from a one-horse to a two-horse machine. There is also a seat, D, and foot-board E. The axle B has a cogged wheel, F, on each end inside the wheel C, which cog-wheel meshes with a pinion, $b$, placed upon a stud, $d$, on the end of the frame. The pinion $b$ meshes further with a pinion, $e$, on the end of a crank-shaft, G, which operates the tedder-forks. The two pinions $b\ b$ are movable laterally upon their studs $d\ d$, so as to throw the crank-shafts G G in and out of gear, as desired. This is accomplished by means of rods $ff$, connecting said pinions with a lever, H, on the frame on opposite sides equidistant from the fulcrum, which lever is located convenient to the right foot of the driver on his seat, thus enabling him instantly to arrest the action of the forks or to put them in motion at pleasure.

The crank-shafts G G are provided each with a series of bends or cranks set at suitable angles, and each bend or crank has two collars or flanges, $i\ i$, between which is formed a true journal. The inner adjacent ends of the two crank-shafts rest in the same journal-box, and the outer end of each shaft in a separate box. All these boxes are constructed alike, each being made in two parts, I and I', the upper part, I', hinged to the front end of the lower part, I, and held closed by means of a bolt, $h$, and thumb-nut $m$.

The entire box is placed between ears or flanges $n\ n$ on a plate, J, which is fastened on the projecting ends of the cross-bars of the frame, and the lower part, I, of the box is pivoted at its forward end between the front ears or flanges, $n\ n$.

Each end box has upon its inner side a stud, $p$, and a similar stud projects from each side of the center box. All of these studs pass through eyes in the ends of arms $t\ t$, which project from a shaft K, as shown. This shaft is provided with a hollow arm or socket, $s$, in which a bent lever, L, is inserted, and this lever may be locked in two positions in a rack, M, on the frame. In one position the crank-shaft journal-boxes are held down in place upon their respective plates or beds J, while when the lever is in the other position the boxes are raised upon their pivots, so that the tedder-forks cannot touch the ground.

Each crank-shaft G is provided with a series of tedder-forks constructed in the following manner: N is the fork-handle, provided in its lower end with a hole for the passage of a pin or bolt, $v$, and above the same on the under side is an open slot, $w$. The tines O are coiled to form an eye over each end of the bolt $v$ and a continuous bow, $x$. This bow is inserted in the open slot $w$, after which the bolt $v$ is passed through the handle and eyes in the tines and a nut screwed on the end of the bolt, thus forming a spring-fork.

To the under side of the handle N is then secured a slotted metal bar or shoulder-piece, P, to fit over the crank between the collars or flanges $i\ i$.

The upper end of the fork-handle N is, by a hinge, $y$, connected with an arm, R, the other end of which is pivoted in a box, Z, fastened upon a bar, S.

A wire spring, $a'$, is passed through slots in the box Z, and each arm of said spring runs between two projections, $b'$, on the side of the box, and then upward along the side of the arm R, and is fastened thereto, thus forming a spring-connection. Each series of fork-handles and their arms are by means of these boxes connected to one bar, S, making two separate and distinct attachments.

The inner ends of the two bars S S are inserted in keepers $d'$, and their outer ends are dropped into open keepers $e'$ and locked by means of latches $f'$.

It will thus readily be seen that the tedder can be easily and quickly attached to and detached from the frame as required.

At each side and in the center on the frame are permanent bearings $h'$ for attaching the rake; but before attaching the same the tedder, as well as the lever L, must be removed.

V V represent the rake-teeth. Each tooth has its inner end bent around a sleeve, $m'$, and a wire spring, $i'$, is turned around the tooth and its arms twisted to form coils, as shown, and then fastened securely to the sleeve, thus forming a separate and independent spring to each rake-tooth.

The sleeves $m'$ are independent of each other, and placed on a square rod, $n'$, so as to be stationary thereon, and held by a nut at each end of the rod. Suitable portions of three of the sleeves are turned so as to form journals to rest in the bearings $h'$.

W is the lever for operating the rake, pivoted to a bow, Y, on the frame, and connected to one of the sleeves by a link and arm, $p'$.

Under the rake are two series of cleaner-teeth, $A'$, each series being coiled around a head, $B'$, which has journals in its ends, and these journals dropped in suitable bearings attached to the frame. The cleaner-teeth $A'$ are extended in front of the head $B'$ and attached to a bar, $C'$, which, by a hook or similar device, is connected to a link, $t'$, hinged or pivoted to an arm on one of the sleeves $m'$ of the rake.

By this arrangement it will be noticed that when the rake-teeth are raised by means of the lever W the cleaner-teeth are at the same time depressed to clean anything that may adhere to the teeth.

Having thus fully described my invention, what I claim as new, and desire to secure by Letters Patent, is—

1. The fork-handle N, provided with the slot $w$, coiled tines O, with bow $x$, bolt $v$, and slotted shoulder-piece P, in combination with the crank-shaft G, having collars $i\ i$, substantially as herein set forth.

2. The combination of the tines O, handle N, hinged arm R, box Z, with lugs $b'$, and the spring $a'$, all constructed substantially as and for the purposes herein set forth.

3. The journal-boxes I I', hinged to bed pieces or plates J, in combination with the arms $t$, shaft K, and lever L, substantially as and for the purposes herein set forth.

In testimony that I claim the foregoing I have hereunto set my hand this 9th day of January, 1880.

ROBT. J. COLVIN.

Witnesses:
H. AUBREY TOULMIN,
J. J. McCARTHY.